3,474,075
POLYURETHANE COMPOSITIONS AND PROCESS
John C. Zemlin, Reading, Mass., assignor to Liner Technology Inc., Burlington, Mass., a corporation of Massachusetts
No Drawing. Filed May 13, 1965, Ser. No. 455,627
Int. Cl. C08g 22/40
U.S. Cl. 260—75                    9 Claims

ABSTRACT OF THE DISCLOSURE

A process of making a cured polymer such as polyurethane by forming a mixture of a polyisocyanate and an active hydrogen-containing compound, e.g., a polyol, which is reactive therewith on curing, which comprises incorporating into said mixture a latent catalyst which is ineffective to cure said mixture at room temperature, the latent catalyst being an organolead compound, and then heating said curable mixture to a temperature of at least 100° C. to activate said catalyst and cure said mixture.

---

This invention relates to the catalytic formation or curing of polyurethanes and to novel curable polyurethane-forming compositions.

The excellent physical properties of polyurethane plastics are well known. It is also well known to prepare nonporous molded polymeric plastics having

groups in the polymer chain, such as polyurethanes and polyureas, by premixing a polyfunctional alcohol or amine and a polyisocyanate, with or without catalyst, casting or otherwise shaping the mixture and then curing the mixture, frequently with heat and pressure: the resulting cured plastic is most commonly a cross-linked elastomer. Attempts have been made to prepare such elastomers in production line operations but these were usually unsuccessful. When the reactive compositions were so compounded as to give a long enough work life to permit normal handling, the curing time was too long. When the catalyst was such as to give short curing times, the work life of the mixture was so short as to make normal handling impractical.

It is therefore an object of this invention to provide a new castable polyurethane-forming composition which has a reasonably long work life after its components have been mixed and which may yet be rapidly cured after casting.

Another object of this invention is the provision of a catalyst-containing composition which is stable enough to be readily handled, worked and shaped at room temperature but which may be cured quickly.

Still another object of this invention is the provision of a new process suitable for the manufacture of polyurethane plastics on high speed production lines.

Other objects of this invention will be apparent from the following detailed description and claims. In this description and claims all proportions are by weight unless otherwise indicated.

In accordance with one aspect of this invention, there is incorporated in the polyurethane-forming composition an organolead compound which acts as a latent, heat-activable catalyst. The resulting mixture has a long work life and may be kept in its unreacted state at room temperature for at least one hour, and preferably for at least 2 hours. It will be understood, however, that the broad aspects of this invention also encompass an improvement in work life, even if it totals less than one hour, when compared to similar systems containing a conventional catalyst or no catalyst. On heating, for example, to a temperature above 100° C., but preferably not above 250° C., e.g., at about 140°–160° C.; the catalyst is activated and the reaction proceeds very rapidly, at a much faster rate than in the absence of the latent catalyst.

The organolead compounds used as latent catalysts in the practice of this invention may be represented by the general formula

where $m$ and $n$ are integers, $m+n$ equals 4, M is 2, 3, or 4, and $n$ is 0, 1 or 2. R is a hydrocarbyl radical having from 1 to 20 carbons, and preferably 3 to 18 carbon atoms, such as an alkyl (e.g., ethyl, methyl, propyl, butyl, lauryl); aryl (e.g., phenyl, tolyl, naphthyl, xenyl); cycloalkyl (e.g., cyclopentyl, cyclohexyl, methyl cyclohexyl); and aralkyl (e.g., benzyl, methyl benzyl, phenylethyl) radicals. X, on the other hand, represents an acidic anion, e.g., halide, carboxylate, sulfate, phosphate and the like. Thus, X may be chloride, bromide, acetate, laurate, stearate, 2-ethylhexoate, acrylate, salicylate, phthalate, citrate, sulfide, imidazole, and similar radicals.

In the special case where $m$ is three, X may also represent $R_3Pb$—, wherein R is the same as defined above. Thus, included as latent catalysts in the practice of this invention are hexaphenyldilead, hexaoctyldilead, hexabutyldilead and the like.

In preparing the compositions of this invention any organic polyisocyanate may be used; for example, 2,4- and 2,6-tolylene diisocyanate, 4,4'-diphenylmethane diisocyanate, 1,4-phenylene diisocyanate, 1,4-cyclohexane-diisocyanate, 4,4' - diphenyldimethylmethanediisocyanate, hexamethylenediisocyanate, dianisidenediisocyanate and the like.

Often it is preferred to prepare a prepolymer by reacting a molar excess of one or more of the above isocyanates with a polyol to form a higher molecular weight and less volatile polyisocyanate, which can then be further reacted with additional polyol, or other active hydrogen-containing compound, to form the final product.

As a source of active hydrogen compounds for reaction with the polyisocyanates, polyether polyols or polyalkylene ether glycols are usually preferred owing to their lower cost. Alternatively, however, hydroxyl terminated polyesters can be used, as can di- or polyamines, a wide variety of diols and triols, and, in fact, any molecule which has at least two active hydrogens as determined by the Zerewitinoff method.

As illustrative examples of suitable diols are ethylene glycol, propylene glycol, butylene glycol-2,3, butylene glycol-1,3, 2-methyl pentanediol-2,4, 2-ethylhexanediol-1, 3, hexamethylene glycol, decamethylene glycol, styrene glycol, N-phenyl diethanolamine, polyglycols (ether glycols) such as diethylene glycol, triethylene glycol, tetraethylene glycol, polyethylene glycols such as those of average molecular weights of 200, 400, 600 and up to 4000 and higher, dipropylene glycol, tripropylene glycol, and polypropylene glycols such as those of average molecular weights of 400, 750, 1200, 2000 and up to 4000 and higher. Other diols which may be used as monoethers of trihydroxy compounds such as glyceryl-alphaallyl ether, glyceryl-alpha-phenyl ether, glyceryl-alphaisopropyl ether, hydroxy esters such as esters (including polyesters) prepared from 1 mol of dibasic acid (such as adipic acid or the dimer of linoleic acid) and 2 moles of dihydric alcohol, esters (including polyesters) prepared from hydroxy acids and dihydric alcohols in mol ratio of 0.5–1:1, and esters of 1 mol of trihydroxy compound and 1 mol of a monobasic acid, such as the monoglyceride of eleostearic acid. Also useful are polyesters prepared by reacting a lactone with a polyol initiator as for example the reaction product of excess E-caprolactone with ethylene glycol. Dihydric phenols such as catechol, resorcinol and 2,2-bis(4-hydroxyphenyl)propane may also be employed as the diols. Examples of trihydroxy compounds are glycerine, triethanolamine, pyrogallol, phloroglucinol, monoethers of tetrahydroxyl compounds such as the monobutyl ether of pentaerythritol, esters of hydroxy acids and trihydroxy compounds in mol ratio of ⅓–1:1, such as glycerine triricinoleate, monoesters of monobasic acids and tetrahydroxy compounds such as pentaerythritol monoleate. Examples of tetrahydroxy compounds are pentaerythritol and its alkylene oxide condensates as well as esters of 1 mol of dibasic acid (e.g. adipic acid) and 2 mols of trihydroxy-compound (e.g. trimethylolpropane). Arabitol, xylitol, sorbitol, dulcitol and mannitol are examples of suitable pentahydroxy and hexahydroxy compounds.

Examples of amines which may be used in the preparation of polyurethanes and polyureas are ethylene diamine, trimethylene diamine, tetramethylene diamine, hexamethylene diamine, octamethylene diamine, decamethylene diamine, dodecamethylene diamine, N,N'-dimethyl decamethylene diamine, N,N'-dibenzyl hexamethylene diamine, cyclohexyl-1,4-diamine, ortho-phenylene diamine, m-phenylene diamine, p-phenylene diamine, benzidine, naphthalene-1,4-diamine, gamma-gamma'-diamino dibutyl oxide, gamma-gamma'-diamino dibutyl sulfide, diethylene triamine and triethylene tetramine, etc. Most often, however, amines are so reactive with isocyanates that catalysts are not needed. Specific exceptions are "hindered" or inactive amines such as methylene bis(2-chloroaniline), dichlorobenzidine, p,p' amino diphenyl sulfone, etc.

The use of various fillers such as carbon black, $TiO_2$, $SiO_2$, $CaCO_3$, etc.; extenders such as vinyl plasticizers, chlorinated hydrocarbons, coal tar pitch, etc.; antioxidants, color stabilizers, such as the organic phosphates; flame proofing agents and other additives well known in the art is contemplated in the compositions of this invention.

The blends of polyisocyanate, polyol, or other active hydrogen-containing material, and latent catalyst are generally syrups or, in some cases, non-viscous liquids. For casting purposes it is desirable, as is well known in the art, to use a blend substantially free of volatile solvents. For coatings which may be applied, for example, to wood furniture or metal panels a volatile solvent or diluent for dissolving or dispersing the reactive composition may be employed, if desired, and may be evaporated before or during the final cure. In either case, the product is non-porous. However, it is also within the broader aspects of this invention to use the reactive compositions containing the latent catalysts in the preparation of polyurethane foams (using suitable foaming agents such as those well known in the art, e.g. water, which reacts with isocyanate groups to yield $CO_2$, or a rapidly volatile fluorocarbon blowing agent) under conditions in which the foaming mixture is brought to a high enough temperature to activate the latent catalyst. It is also within the broader aspects of this invention to use the reactive compositions, containing the latent catalysts, along with inert fillers and other additives to form a powder and to apply this powder to a heated substrate by the known techniques of coating with fluidized beds. The compositions may also be applied as gels; for example, by knife coating onto a cloth or paper substrate and then heating to obtain a cured coating. Depending on the choice of the known reactive components, as is well understood in the art, the cured products can be thermosetting or thermoplastic, and can range from soft elastomers to hard brittle solids.

The heating of the compositions employed in the practice of this invention may advantageously be effected by baking in a hot air or infrared oven; by dielectric heating; by conduction as in a steam- or electrically-heated mold or through a heated substrate onto which the composition has been coated; by submerging them in a hot inert fluid, such as a silicone oil; or by other means well known in the art.

The proportion of catalyst may be varied to some extent in accordance with desired curing rate. Small amounts of catalyst, e.g. on the order of 1%, are very effective. Advantageously the proportion of catalyst is in the range of about 0.01 to 5%, preferably in the range of about 0.1 to 2%, of the total composition. Frequently, amounts below 0.01 to 0.05% will produce no effect, whereas the effect of catalyst concentrations above 0.05% will be largely independent of concentration. The following examples are given to illustrate this invention further:

EXAMPLE 1

An isocyanate terminated prepolymer was prepared from one mole of a 400 molecular weight triol (TP440—a propylene oxide adduct of trimethylolpropane) and 3 mols of Hylene TM, a commercial grade of 80%, 2,4- and 20% 2,6-tolylene diisocyanate. The prepolymer had an equivalent weight of 310. To a 31 g. portion was added a mixture of 30 g. of a hydroxyl terminated ethyleneglycol-adipic acid polyester having a hydroxyl No. of 168, 2 g. Santocel C, a finely divided silica, 0.6 g. catalyst and 1 g. $TiO_2$. All ingredients but the prepolymer were first mixed on a laboratory paint mill and then at room temperature added to the prepolymer, which was mixed by hand avoiding the incorporation of air. The final mixture was a thixotropic gel which was coated with a draw down blade to a thickness of 10 mils on kraft paper. The paper was then exposed to a 170° C. air blast for 45 sec. and was subsequently cooled with air with the following results:

| Catalyst | Strike Through | Amount of Cure | Room Temp. Pot Life of Coating |
|---|---|---|---|
| None | Considerable | None | Over 8 hrs. |
| Tetraphenyllead | Very slight | Complete | Do. |
| Hexaphenyldilead | Slight | do | Do. |
| Tetrabutyllead | Very slight | do | Do. |
| Dibutyllead dilaurate | None | do | Do. |
| Dibutyltin dilaurate | Gelled during final mixing | | 1 minute. |
| Methyldiethanolamine | Moderate | Partial | 20 min. |

The last two catalysts, dibutyltindilaurate and methyldiethanolamine, were included as representative of catalysts being used today for curing of polyurethane resins. The limited pot life of the catalyzed compositions resulting from their use is evident.

EXAMPLE 2

An isocyanate terminated prepolymer was prepared from one mol of a 2500 molecular weight trimethylolpropane-initiated triol of polypropyleneglycol (i.e. a reaction product of trimethylolpropane and propylene oxide) and 2.5 mols of Hylene TM, a commercial grade of 80% 2,4- and 20% 2,6-tolylene diisocyanate. The resulting prepolymer had an equivalent weight of 1202 with an available NCO content of 3.5%. A series of compositions were prepared by adding 10.2 gms. of this prepolymer to 5.2 gms. of a 1040 molecular weight polypropylene glycol diol and 0.15 gm. of the below listed catalyst. Each mixture was stirred vigorously and then a 0.15 cc. portion was placed on aluminum plate inclined at 20° from the horizontal and maintained at 150° C.

The time for the same to gel as evidenced by cessation of movement down the plate was measured as follows:

| Catalyst | Time to Gelation 150° C. (sec.) | R.T. (hrs.) | Appearance (24 hrs.) R.T. |
|---|---|---|---|
| R$_4$Pb: | | | |
| Tetraphenyllead | 25 | 12+ | Liquid. |
| Tetraethyllead | 20 | 12+ | Do. |
| R$_3$Pb-PbR$_3$, Hexaphenyldilead | 17 | 12+ | Do. |
| R$_3$PbX: | | | |
| Triphenyllead thioacetate | 60 | 12+ | Do. |
| Triphenyllead acetate | 25 | 12+ | Do. |
| Tributyllead acetate | 18 | 12+ | Do. |
| Triphenyllead phenyl sulfide | 28 | 12+ | Do. |
| N-(Tributylplumbyl)imidazole | 19 | 12+ | Do. |
| R$_2$PbX$_2$: | | | |
| Diphenyllead diacetate | 17 | 12+ | Viscous liquid |
| Dibutyllead diacetate | 12 | 12+ | Do. |
| RPbX$_3$: | | | |
| Phenyllead triacetate | 12 | ½ | Soft rubber. |
| Phenyllead triisobutyrate | 11 | ¾ | Do. |
| B-naphthyllead tribenzoate | 10 | ½ | Do. |
| None | 240+ | 12+ | Liquid. |

EXAMPLE 3

An isocyanate terminated prepolymer was prepared from 2 equivalents of a 700 mol. wt. polypropyleneglycol diol, 3 equivalents of a 750 mol. wt. trimethylolpropane initiated polypropyleneglycol triol and 10.5 equivalents of Hylene TM, a commercial grade of 80% 2,4- and 20% 2,6-tolylene diisocyanate. The resulting prepolymer had an equivalent weight of 442 and a free NCO content of 9.5%. A number of catalytic materials were tested with this prepolymer by first mixing 0.10 gm. of catalyst in 0.437 gm. of trimethylolpropane previously dissolved in 0.45 gm. of 1,4-butane diol. 8.82 gms. of prepolymer were then added with through mixing at room temperature. A 0.15 cc. portion was then placed on an aluminum plate inclined at 20° from the horizontal and maintained at 150° C. The time for the sample to gel as evidenced by cessation of movement down the plate was measured as follows:

| Catalyst | Time to Gelation 150° C. (sec.) | R.T. (hrs.) | Appearance (24 hrs. R.T.) |
|---|---|---|---|
| R$_4$Pb: | | | |
| Tetraphenyllead | 32 | 12+ | Grease. |
| Tetra-n-butyllead | 15 | 12+ | Do. |
| Tetra-n-octyllead | 22 | 12+ | Do. |
| Tetraethyllead | 18 | 12+ | Do. |
| R$_3$Pb-PbR$_3$: | | | |
| Hexaphenyldilead | 18 | 12+ | Do. |
| Hexacyclohexyldilead | 18 | 12+ | Do. |
| Hexaethyldilead | 13 | 12 | Soft rubber. |
| R$_3$PbX: | | | |
| Triphenyllead thioacetate | 40 | 12+ | Grease. |
| Tributyllead acetate | 13 | 12 | Soft rubber. |
| Tributyllead laurate | 18 | 12+ | Grease. |
| Tribenzyllead acetate | 22 | 12+ | Do. |
| Triphenyllead hydroxide | 14 | 12+ | Do. |
| Tricyclohexyllead acetate | 19 | 12+ | Do. |
| Triphenyllead laurate | 37 | 12+ | Do. |
| Triphenyllead phenylsulfide | 25 | 12+ | Do. |
| N-(Tributylplumbyl)-imidazole | 15 | 12+ | Do. |
| Triphenyllead acetate | 13 | 12+ | Do. |
| R$_2$PbX$_2$: | | | |
| Diphenyllead diacetate | 6 | 10 | Soft rubber. |
| Dibutyllead dichloride | 27 | 12+ | Grease. |
| Diphenyllead dilaurate | 18 | 12+ | Do. |
| Dibenzyllead dilaurate | 19 | 12+ | Do. |
| Dibutyllead dilaurate | 12 | 12+ | Do. |
| Di-p-tolyllead diacetate | 8 | 12 | Soft rubber. |
| Dibutyllead diacetate | 5 | 8 | Do. |
| RPbX$_3$: | | | |
| Phenyllead triacetate | 1 | 2/60 | Firm rubber. |
| Phenyllead triisobutyrate | 2 | 3/60 | Do. |
| B-naphthyllead tribenzoate | 4 | 1/10 | Do. |
| Controls: | | | |
| None | 180+ | 12+ | Grease. |
| Dibutyltin dilaurate | 4 | 1/60 | Firm rubber. |

This indicates the strong high temperature catalytic effect of the organo-lead compounds along with their low activity at room temperature in comparison to dibutyltin dilaurate, one of the fastest known commercial catalysts. This and the previous example also indicate the surprising difference between the R$_2$PbX$_2$ compounds and the RPbX$_3$ compounds.

EXAMPLE 4

A prepolymer was prepared by reacting one mol of a 2000 M.W. diethyleneglycol initiated polyester of E-caprolactone with two mols of p-phenylene diisocyanate. The resulting viscous liquid was mixed at room temperature with 1,4-butane diol at an NCO to OH ratio of 1.2. This mixture was then divided into small portions and to each portion 1% by weight of a catalyst was added. 0.15 cc. of each portion was then placed on an inclined plane, kept at 160° C. and the time for loss of mobility noted.

| Catalyst | Time to Gelation 150° C. (sec.) | R.T. (hrs.) | Appearance (24 hrs. R.T.) |
|---|---|---|---|
| None | 180+ | 12+ | Very viscous liquid. |
| Dibutyltin dilaurate | 6 | ½ | Firm rubber. |
| Triphenyllead thioacetate | 21 | 12+ | Very viscous liquid. |
| Dibutyllead dilaurate | 19 | 12+ | Do. |
| Diphenyllead diacetate | 19 | 12+ | Do. |
| Phenyllead triisobutyrate | 12 | 1 | Firm rubber. |

EXAMPLE 5

A mixture of 50 gms. of Carwinate 125M (a technical grade of diphenylmethanediisocyanate containing about 11% 2,4'-isomer and 89% 4,4'-isomer), 90 gms. of PPG 1025 (a commercial 1000 M.W. polypropylene glycol), and 26 gms. of TP 440 was prepared at 30° C. and to which was then added 50 gms. of Atomite (a commercial grade of powdered CaCO$_3$) and 10 gms. of rutile TiO$_2$. The resulting paste was degassed at 1 mm. Hg for 10 min. and then divided into portions of 22.6 gms. Catalysts were mixed into the portions and then samples of each portion placed in a 150° C. heated metal mold having a cavity measuring ¼″ x ¼″ x ³⁄₃₂″ deep. After 60 sec. the cavity was emptied and the casting examined as follows:

| Catalyst | Parts per hundred of resin | Appearance of Casting | Pot life of unused portion, hrs. |
|---|---|---|---|
| None | | Liquid | 12+ |
| Triethylenediamine | 1.0 | do | ½ |
| Tetraphenyllead | 1.0 | Firm rubber | 12+ |
| Hexaphenyldilead | 1.0 | do | 12+ |
| Triphenyllead acetate | 1.0 | do | 12+ |
| Dibutyllead dilaurate | 0.01 | Liquid | 12+ |
| Do | 0.10 | Firm rubber | 12+ |
| Do | 1.0 | do | 12+ |
| Phenyllead triacetate | 1.0 | do | 10/60 |

While particular embodiments of this invention are shown above, it will be understood that the invention is obviously subject to variations and modifications without departing from its broader aspects.

What is claimed is:

1. In the process of makng a cured polymer by forming a mixture of a polyisocyanate and a polyhydroxy compound which is reactive therewith on curing to give a polymer having repeating units with

groups in the polymer chain, and shaping and curing said mixture, the improvement which comprises incorporating into said mixture a latent catalyst which is substantially ineffective to cure said mixture at room temperature and wherein said mixture has a work life of at least 2 hours, and is free of catalysts which are active at room temperature, said latent catalyst being an organolead compound having the general formula R$_m$PbX$_n$ where $m+n$ equal 4, and $m$ can be 2, 3, or 4 while $n$ can be 0, 1, or 2, R is a hydrocarbyl radical and X is halide, carboxylate, sulfide, hydroxide or imidazole anions or PbR$_3$, and then heating said curable mixture to a temperature of at least 100° C. to activate said catalyst and to polymerize said mixture.

2. Process for the production of cured polyurethanes which comprises forming a curable mixture of a polyisocyanate and a polyol reactive therewith on curing to give a polyurethane, which comprises incorporating into said mixture a latent catalyst which is substantially ineffective to cure said mixture at room temperature and wherein said mixture has a work life of at least 2 hours and is free of catalysts which are active at room temperature, said latent catalyst being an organolead compound having the general formula $R_mPbX_n$ where $m+n$ equal 4, and $m$ can be 2, 3, or 4 while $n$ can be 0, 1, or 2, R is a hydrocarbyl radical having from 1 to 20 carbon atoms, and X is halide, carboxylate, sulfide, hydroxide or imidazole anions or $PbR_3$, and then heating said curable mixture to a temperature of at least 100° C. to activate said catalyst and to polymerize said mixture.

3. The process of claim 2 wherein said latent catalyst is tetraphenyllead.

4. The process of claim 2 wherein said latent catalyst is tetraethyllead.

5. The process of claim 2 wherein said latent catalyst is hexaphenyldilead.

6. The process of claim 2 wherein said latent catalyst is triphenyllead thioacetate.

7. The process of claim 2 wherein said latent catalyst is diphenyllead diacetate.

8. The process of claim 2 wherein said latent catalyst is dibutyllead dichloride.

9. The process of claim 2 wherein the latent catalyst is used in an amount within the range of about 0.01 to 5% by weight based on the total weight of the composition.

References Cited

UNITED STATES PATENTS 3,324,054    6/1967    Overmars _____ 260—77.5 XR

FOREIGN PATENTS 898,060    6/1962    Great Britain.

OTHER REFERENCES

Overmars et al., Chima, vol. 19, pp. 126–128, Mar. 15, 1965 (presented at the Third Symposium "Makromolekulare Stoffe," Zurich, October 1964).

DONALD E. CZAJA, Primary Examiner

M. J. WELSH, Assistant Examiner

U.S. Cl. X.R.

260—2.5, 18, 77.5